(12) United States Patent
Takeda et al.

(10) Patent No.: US 6,975,446 B2
(45) Date of Patent: Dec. 13, 2005

(54) OPTICAL AMPLIFIER, METHOD FOR COMPENSATING FOR TEMPERATURE DEPENDENCY OF GAIN FLATNESS OF AN OPTICAL AMPLIFIER AND OPTICAL TRANSMISSION PATH INCLUDING OPTICAL AMPLIFIER

(75) Inventors: Yasushi Takeda, Sakura (JP); Noriaki Shimada, Sakura (JP); Tetsuya Sakai, Sakura (JP); Akira Wada, Sakura (JP)

(73) Assignee: Fujikura Ltd., Tokyo (JP)

( * ) Notice: Subject to any disclaimer, the term of this patent is extended or adjusted under 35 U.S.C. 154(b) by 243 days.

(21) Appl. No.: 10/650,668

(22) Filed: Aug. 29, 2003

(65) Prior Publication Data

US 2004/0042062 A1 Mar. 4, 2004

(30) Foreign Application Priority Data

Sep. 4, 2002 (JP) .............................. 2002-258962

(51) Int. Cl.[7] .............................................. H01S 3/00
(52) U.S. Cl. ................. 359/337.1; 359/337.4
(58) Field of Search ......................... 359/337.1, 337.4

(56) References Cited

U.S. PATENT DOCUMENTS 6,049,414 A * 4/2000 Espindola et al. .......... 359/337
6,583,922 B2 * 6/2003 Srikant et al. .............. 359/337

OTHER PUBLICATIONS

Perlin et al, "ON Trade-off between noise and nonlinearity in WDM systems with ditributed Raman amplification", 2002, OFC 2002, pp. 178-180.*
Mototaka Kakui et al., Technical Digest of Optical Fiber Communication Conference, USA, Mar. 8, 2000, pp. 6-8, WA3.
Yuu Ishii et al., Proceedings of Topical Meeting on Optical Amplifiers and their Applications, Italy, Jul. 1, 2001, pp. 114-116.
3. Hiroji Masuda, Technical Digest of Optical Fiber Communication Conference, USA, Mar. 7, 2000, p.p. 2-4, TuA1.

* cited by examiner

Primary Examiner—Mark Hellner
(74) Attorney, Agent, or Firm—Sughrue Mion, PLLC

(57) ABSTRACT

An optical amplifier has a gain flatness which is maintained to be substantially constant regardless of temperature changes. The optical amplifier includes an EDF amplifying section and a Raman amplifying section, the Raman amplifying section having a temperature dependent gain profile which enables compensating for the temperature dependent gain profile of the EDF amplifying section. The Raman amplifying section includes a wavelength lock grating whose transmission wavelengths shift toward the short wavelength side as the temperature increases. The wavelength lock grating is preferably disposed to have the same temperature as that of an EDF of the EDF amplifying section. A method for compensating for temperature dependency of gain flatness of an optical amplifier and an optical transmission path including an optical amplifier are also disclosed.

14 Claims, 8 Drawing Sheets

OPTICAL AMPLIFIER, METHOD FOR COMPENSATING FOR TEMPERATURE DEPENDENCY OF GAIN FLATNESS OF AN OPTICAL AMPLIFIER AND OPTICAL TRANSMISSION PATH INCLUDING OPTICAL AMPLIFIER

Priority is claimed under 35 U.S.C. § 119 to Japanese patent application no. 2002-258962 filed Sep. 4, 2002 of which is incorporated herein by reference.

BACKGROUND OF THE INVENTION

1. Field of the Invention

The present invention relates to an optical amplifier used in, for example, a wavelength division multiplexing (WDM) optical transmission system, and in particular, relates to an optical amplifier whose gain flatness is maintained to be substantially constant regardless of temperature change. The present invention also relates to a method for compensating for temperature dependency of gain flatness of an optical amplifier, and furthermore, relates to an optical transmission path including an optical amplifier.

2. Background Art

In recent years, optical amplifiers using erbium doped optical fibers (hereinafter, such an optical fiber will be simply referred to as an EDF, and such an optical amplifier will be simply referred to as an EDF amplifier) have been widely used in wavelength division multiplexing (WDM) optical transmission systems. An EDF amplifier operates based on the principle that input light, being input into the EDF of the EDF amplifier, in which a population inversion has been formed due to pumping of erbium ions by applying excitation light, e.g., laser radiation, thereto, is optically amplified due to effects of stimulated emission so that a gain is obtained. Because signal light can be amplified by high gain and with low noise using an EDF amplifier, EDF amplifiers will be more widely applied to high speed, large capacity, and long-haul transmission systems in which a high density wavelength division multiplexing transmission method is utilized.

It is generally known that an EDF has wavelength dependency in gain, i.e., different gain is obtained depending on the wavelength of the signal light. Due to this phenomenon, when an EDF amplifier is used in a wavelength division multiplexing optical transmission system, countermeasures must be taken to enable the gain obtained by the EDF amplifier to be uniform in the operating wavelength band so that the intensity of the optically amplified signal light is constant regardless of the wavelength thereof. As an example of such countermeasures, a gain flattening filter (GFF) may be provided at the output side of the EDF amplifier in order to apply transmission loss to the output light so that gain profile of the amplified light with respect to wavelength is flattened.

Figure 8:
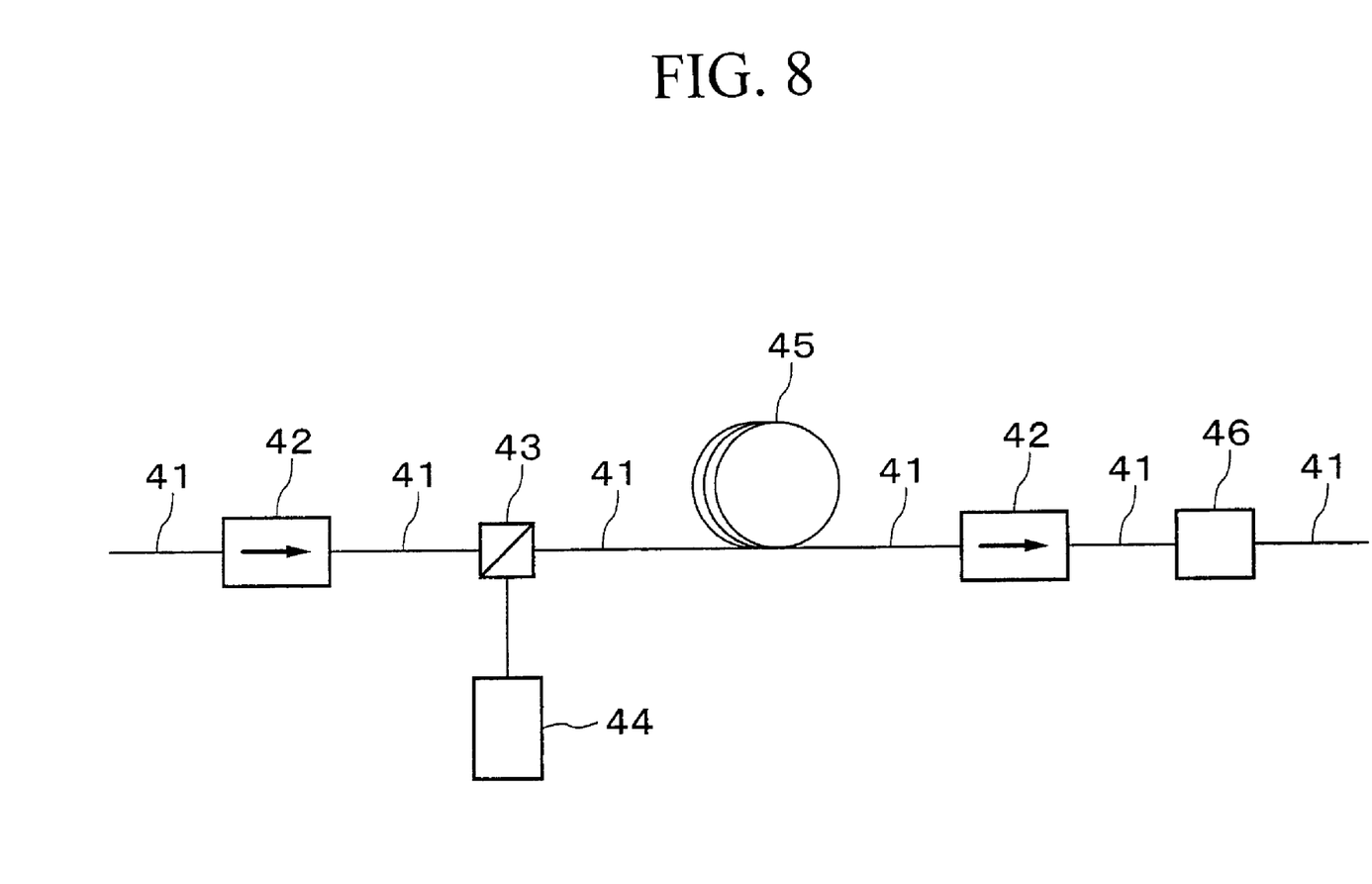
FIG. 8 is a schematic diagram showing an example of conventional EDF amplifiers.

FIG. 8 shows an example of conventional EDF amplifiers, in which signal light passed through an optical transmission path 41 passes an optical isolator 42, and is input into an EDF 45 via a WDM coupler 43. On the other hand, excitation light emitted from an excitation light source 44 is input into the EDF 45 via the WDM coupler 43. The signal light optically amplified in the EDF 45 is input into a gain flattening filter 46 via another optical isolator 42. The amplified signal light is subjected to transmission loss when passing through the gain flattening filter 46, and wavelength dependency in gain is compensated for so that the gain obtained by the EDF 45 is flattened in a predetermined wavelength band. Finally, output signal light is sent into the optical transmission path 41.

As described above, it is possible to flatten the gain profile of the EDF 45, and to obtain the output signal light having substantially uniform light intensity with respect to wavelength by using the gain flattening filter 46; however, it is generally known that the gain profile of the EDF 45 changes depending on ambient temperature. Because of this phenomenon, when the ambient temperature changes, it is impossible to perfectly flatten the gain profile (i.e., the gain flatness is degraded) by merely using the gain flattening filter 46 in the optical amplifier shown in FIG. 8.

In order to overcome the above problem, a countermeasure has been proposed in "Mototaka Kakui et al., Technical Digest of Optical Fiber Communication Conference, USA, 2000, pp. 6–8, WA3" in which an EDF is accommodated in a thermostatic bath which is provided with temperature control measures such as heaters, coolers, Peltier elements, etc., or with heat insulation material. A drawback of this countermeasure is that the optical amplifier inevitably becomes larger because the EDF must be accommodated in a thermostatic bath. Another drawback is that the optical amplifier consumes a large amount of electrical power because the temperature control measures such as heaters, coolers, Peltier elements, etc., must be supplied with external electrical power.

Another countermeasure is disclosed in "Yuu Ishii et al., Proceedings of Topical Meeting on Optical Amplifiers and their Applications, Italy, 2001, pp. 114–116", in which an optical fiber grating as an attenuation filter is provided at the output side of an amplifier. Because the transmission loss property of the optical fiber grating is set to be opposite with respect to temperature dependency of the gain profile of an EDF, the optical fiber grating applies loss to the output signal light to compensate for changes in gain due to temperature change. However, because temperature dependent changes in the transmission loss of the optical fiber grating are generally smaller than temperature dependent changes in gain of the EDF, changes in gain due to temperature change cannot be sufficiently compensated for. Another drawback, when using an attenuation filter, is that amplification efficiency of the optical amplifier is reduced because the output signal light is attenuated when temperature dependent changes in gain are compensated for.

Furthermore, various research results for seeking applications of EDF amplifiers to high density wavelength division multiplexing (WDM) transmission systems have been reported. For example, an EDF amplifier provided with a Raman amplifier for suppressing noise has been reported in "Hiroji Masuda, Technical Digest of Optical Fiber Communication Conference, USA, 2000, p.p. 2–4, TuA1". However, no countermeasures have been proposed which would enable overcoming the above-mentioned problem of gain flatness of an amplifier being degraded due to changes in the gain profile of an EDF depending on temperature.

SUMMARY OF THE INVENTION

Based on the above problems, an object of the present invention is to provide an optical amplifier and an optical transmission path in which gain flatness is not degraded, and a substantially flat gain profile is obtainable. Another object of the present invention is to provide a method for compensating for temperature dependency of gain flatness of an EDF optical amplifier.

In order to achieve the above objects, a first aspect of the present invention provides an optical amplifier including an EDF amplifying section and a Raman amplifying section, wherein the Raman amplifying section has a temperature dependent gain profile which enables compensating for temperature dependent changes in a gain profile of the EDF amplifying section.

In the above optical amplifier, the Raman amplifying section may include a wavelength lock grating whose transmission wavelengths shift toward the short wavelength side as the temperature increases, and the wavelength lock grating may preferably be disposed to have the same temperature as that of an EDF included in the EDF amplifying section.

In the above optical amplifier, the Raman amplifying section may be disposed upstream or downstream with respect to the EDF amplifying section.

In the above optical amplifier, the EDF amplifying section and the wavelength lock grating may be accommodated in single body of equipment.

In order to achieve the above objects, a second aspect of the present invention provides a method for compensating for temperature dependent gain flatness of an optical amplifier including providing an EDF amplifying section and a Raman amplifying section in the optical amplifier; and setting the temperature dependent gain profile of the EDF amplifying section and the temperature dependent gain profile of the Raman amplifying section to compensate for each other when temperature changes.

In the above method, the Raman amplifying section may include a wavelength lock grating whose transmission wavelengths shift toward the short wavelength side as the temperature increases, and the method may further include making the temperature of the wavelength lock grating be the same as that of an EDF included in the EDF amplifying section.

In order to achieve the above objects, a third aspect of the present invention provides an optical transmission path including a base transmission path including a signal transmission optical fiber and an EDF amplifying section for amplifying signal light passing through the signal transmission optical fiber; and a Raman amplifying section, which includes an excitation light source for performing a Raman type amplification using the signal transmission optical fiber as an amplifying medium, and a wavelength lock grating that transmits excitation light having a predetermined wavelength in order to input the excitation light into the signal transmission optical fiber, wherein transmission wavelengths of the wavelength lock grating shift toward the short wavelength side as the temperature increases.

In the present specification, "EDF" means an optical fiber in which a rare earth element such as erbium is doped, and which functions as an amplifying medium. "EDF" amplifying section means an optical amplifying section in which an EDF is used as an amplifying medium.

In addition, "gain profile" means a distribution pattern of gains respectively corresponding to wavelengths when amplification is performed, and more specifically, a distribution pattern of gains with respect to wavelengths when a graph is drawn by assigning wavelength to the x-axis, and assigning gain to the y-axis.

DETAILED DESCRIPTION OF THE PREFERRED EMBODIMENTS

An embodiment of the present invention will be explained with reference to the accompanying drawings.

Figure 1:
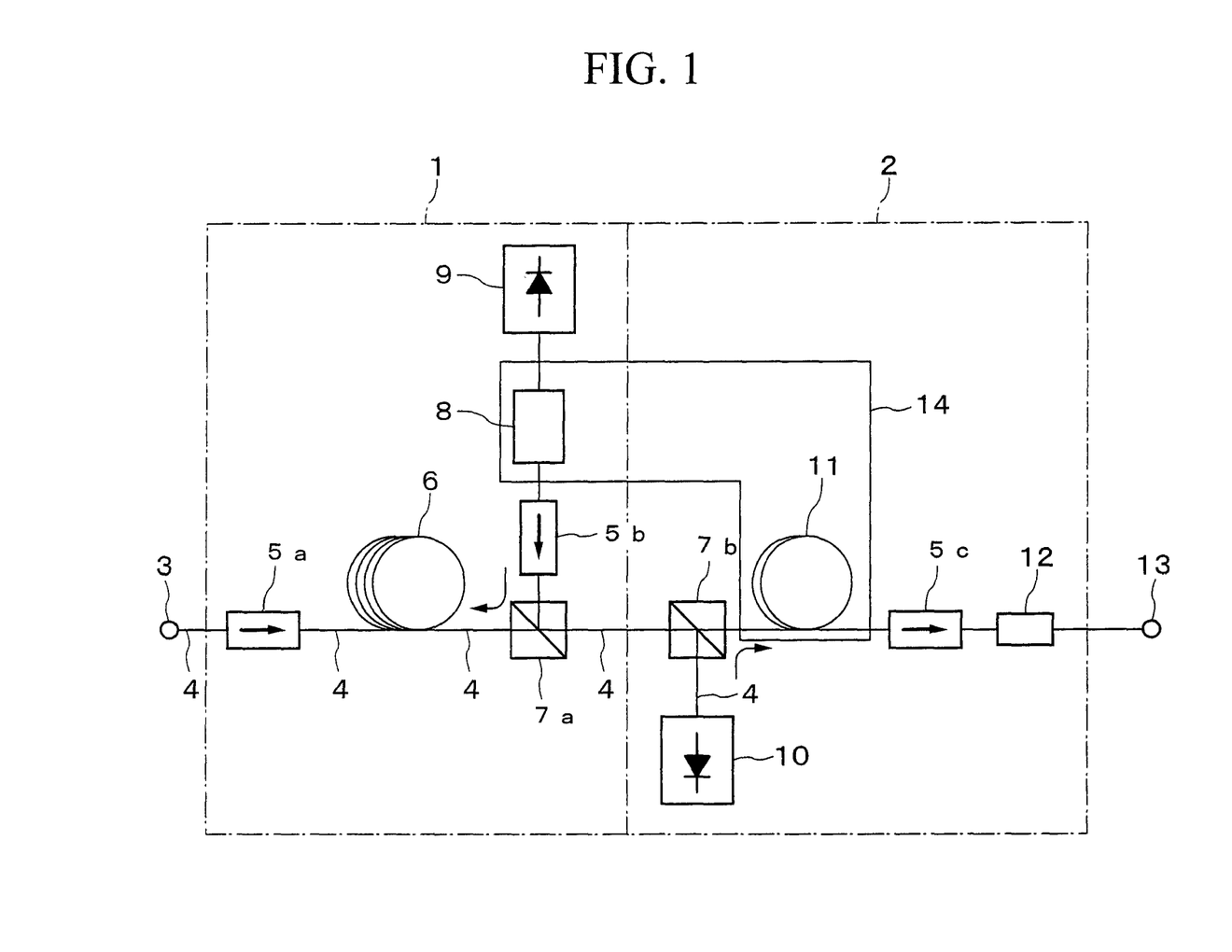
FIG. 1 is a schematic diagram showing an example of optical amplifiers according to an embodiment of the present invention.

FIG. 1 is a schematic diagram showing an example of optical amplifiers according to an embodiment of the present invention. The optical amplifier includes a Raman amplifying section 1 and an EDF amplifying section 2 in such a manner that the Raman amplifying section 1 is disposed upstream with respect to the EDF amplifying section 2. In FIG. 1, reference symbol 4 indicates optical transmission paths such as optical fibers that are disposed between various components to form transmission paths.

An input section 3 of the optical amplifier is connected to an end of an amplifying optical fiber 6 via an isolator 5a on the Raman amplifying section 1. The amplifying optical fiber 6 is an amplifying medium formed by, for example, a single-mode optical fiber. The other end of the amplifying optical fiber 6 is connected to an input port of a WDM coupler 7a.

An end of a wavelength lock section 8 having a wavelength lock fiber grating is connected to the other input port of the WDM coupler 7a via an optical isolator 5b. An excitation light source 9 such as, for example, a semiconductor laser whose emission wavelength is in a range from 1400 nm to 1500 nm, is connected to the other end of the wavelength lock section 8. An output port of the WDM coupler 7a is connected to an input port of the EDF amplifying section 2.

In the EDF amplifying section 2, one input port of the WDM coupler 7b is connected to the output end of the Raman amplifying section 1. An excitation light source 10 such as, for example, a semiconductor laser whose emission wavelength is in the 1480 nm band or 980 nm band, is connected to the other input port of the WDM coupler 7b. An output port of the WDM coupler 7b is connected to an end of an EDF 11 as an amplifying medium.

The other end of the WDM coupler 7b is connected to an input end of a gain flattener 12 via an optical isolator 5c. An output end of the gain flattener 12 is connected to an output section 13 of the optical amplifier.

In the optical amplifier having the above structure, at least the wavelength lock section 8 of the Raman amplifying section 1 and the EDF 11 of the EDF amplifying section 2 are accommodated in a body of equipment 14 in order to have the same temperature with respect to each other.

Figure 2:
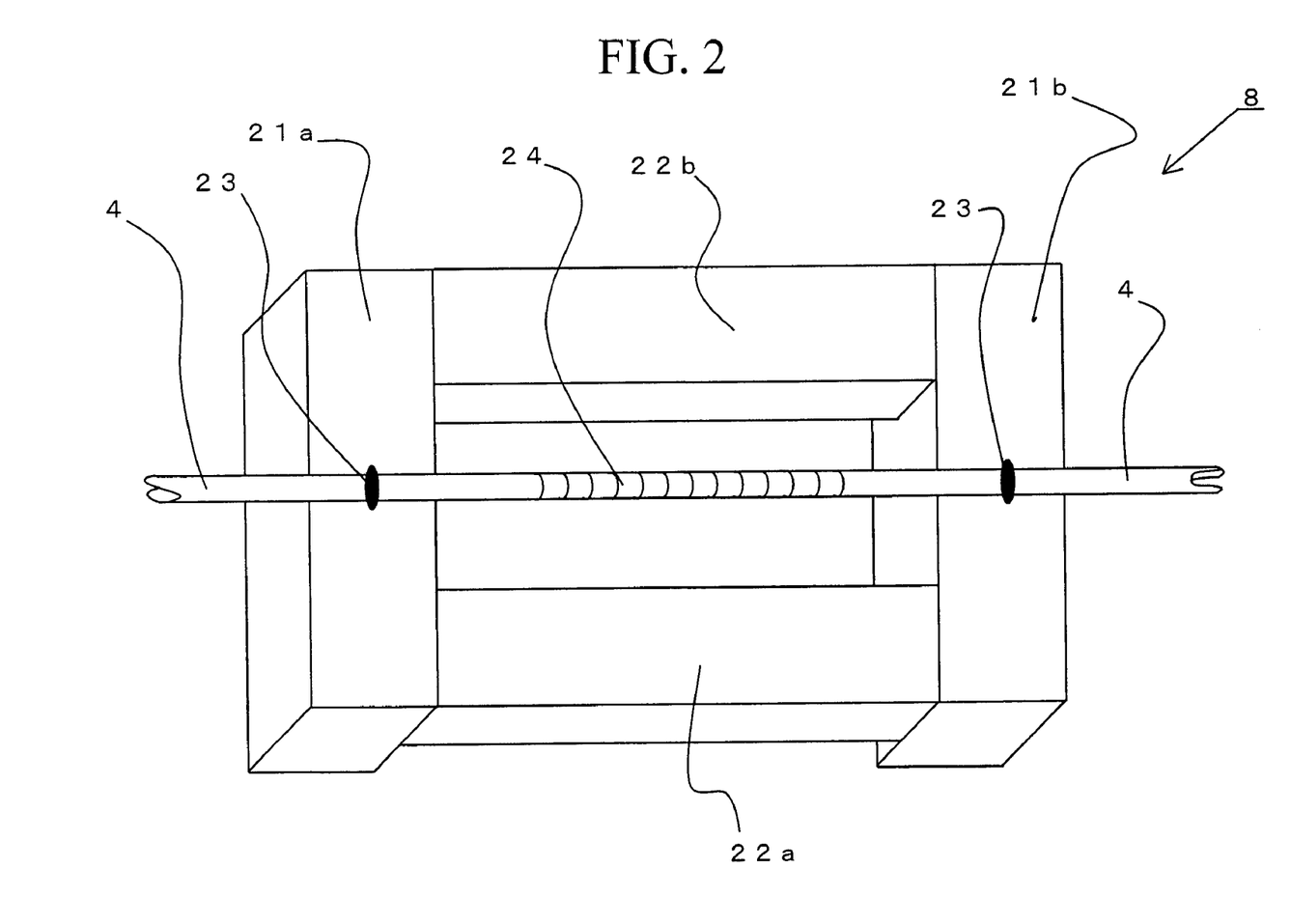
FIG. 2 is a schematic diagram showing an example of a wavelength lock fiber grating included in a Raman amplifying section.

FIG. 2 is a schematic diagram showing an example of a wavelength lock section 8 included in the Raman amplifying section 2. Reference symbol 24 indicates a wavelength lock fiber grating. The wavelength lock fiber grating 24 is an optical fiber having a grating in which the refractive index of a core thereof varies at a predetermined period. The wavelength lock fiber grating 24 merely transmits excitation light having a predetermined wavelength out of excitation light emitted from excitation light source 9, and sends the transmitted excitation light into the amplifying optical fiber 6 via the optical isolator 5b and the WDM coupler 7a.

The input end and output end of the wavelength lock fiber grating 24 are fixed to a pair of rectangular support elements 21a and 21b at fixing points 23 and 23, respectively. The main surfaces of the pair of rectangular support elements 21a and 21b face toward each other and are connected to each other by means of a pair of rectangular connecting elements 22a and 22b.

The rectangular support element 21a and the pair of connecting elements 22a and 22b are made of, for example, silica, ceramics having low thermal expansion coefficient, Invar™ alloy, etc. On the other hand, the other support element 21b is made of aluminum, brass, etc., which has greater thermal expansion coefficient than that of the wavelength lock fiber grating 24 and the rectangular connecting elements 22a and 22b.

In general, the wavelength lock fiber grating 24 thermally expands as the temperature thereof increases, and the period of the grating becomes longer, whereby the wavelength lock fiber grating 24 transmits excitation light having longer wavelengths out of excitation light emitted from excitation light source 9. Therefore, conventionally, the temperature of the wavelength lock fiber grating 24 is maintained to be constant so that only excitation light having a predetermined wavelength is transmitted, and so that the wavelength of the excitation light input into the amplifying optical fiber 6 as an amplifying medium is maintained to be constant.

However, in the case of the wavelength lock section 8, as the temperature increases, the support element 21b thermally expands, and the wavelength lock fiber grating 24 is compressed in the longitudinal direction thereof. Therefore, the wavelength lock fiber grating 24 is compressed as the ambient temperature increases, and as a result, the period of the grating becomes shorter, and the wavelength lock fiber grating 24 transmits excitation light having shorter wavelengths included in the excitation light, which is to be input into the amplifying optical fiber 6 as an amplifying medium.

Figure 3:
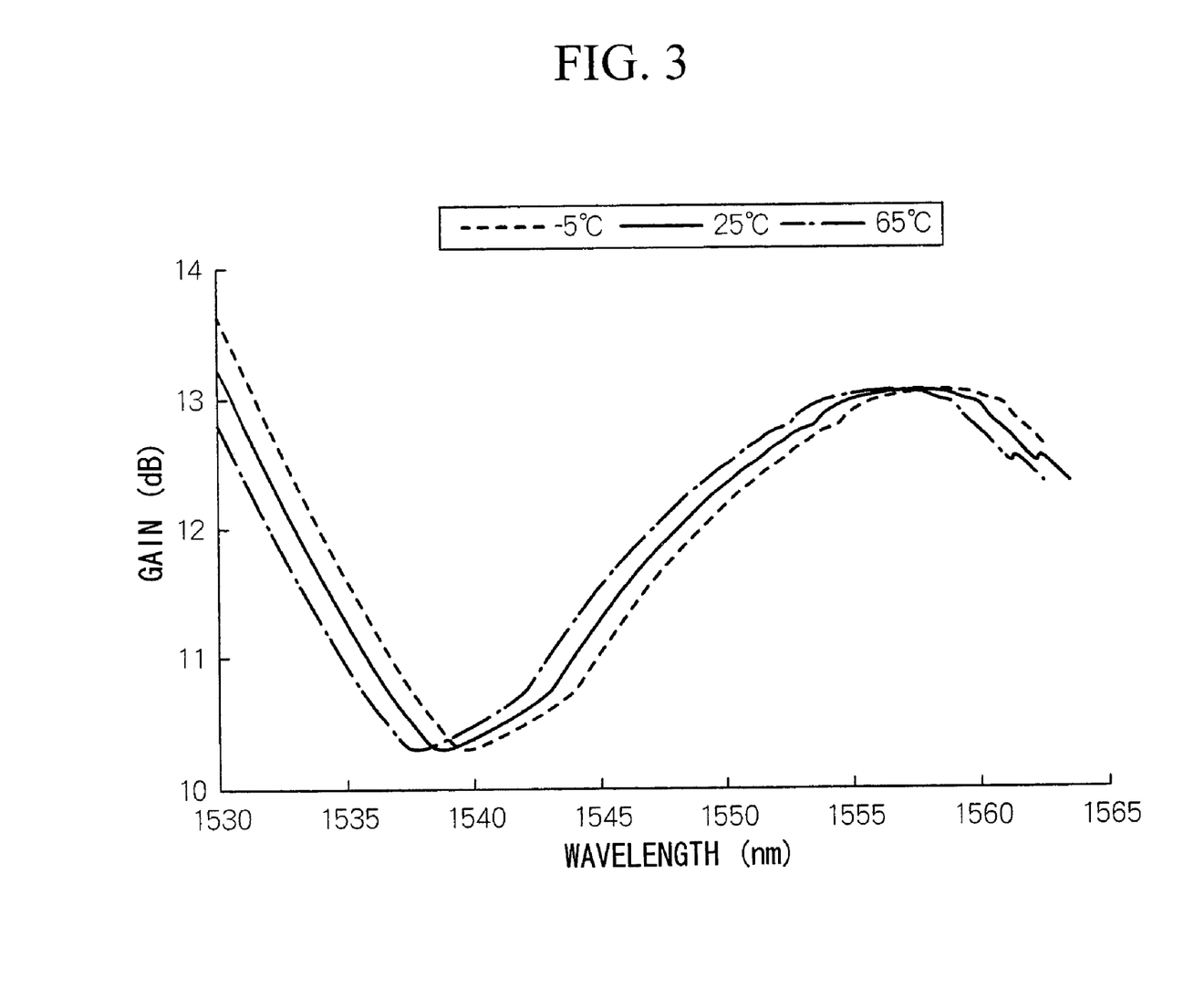
FIG. 3 is a graph showing gain profiles of the Raman amplifying section at various temperatures.

FIG. 3 is a graph showing gain profiles of the Raman amplifying section 1 at various temperatures. It is generally known that the gain profile obtained by Raman scattering effects in the Raman amplifying section 1 is determined by the wavelength of the excitation light, and more specifically, the gain profile shifts toward the short wavelength side as the wavelength of the excitation light becomes shorter. In the case of the Raman amplifying section 1, the wavelength lock fiber grating 24 has an inverted temperature dependent characteristic when compared with that of a conventional fiber grating, i.e., the wavelength lock fiber grating 24 transmits excitation light having a shorter wavelength as the temperature increases. As a result, the gain profile shifts toward the short wavelength side.

When a signal light is input through the input section 3 of the optical amplifier, the signal light is, first, amplified in the Raman amplifying section 1 to have the gain profile shown in FIG. 3, which depends on the ambient temperature around the wavelength lock fiber grating 24.

Figure 4:
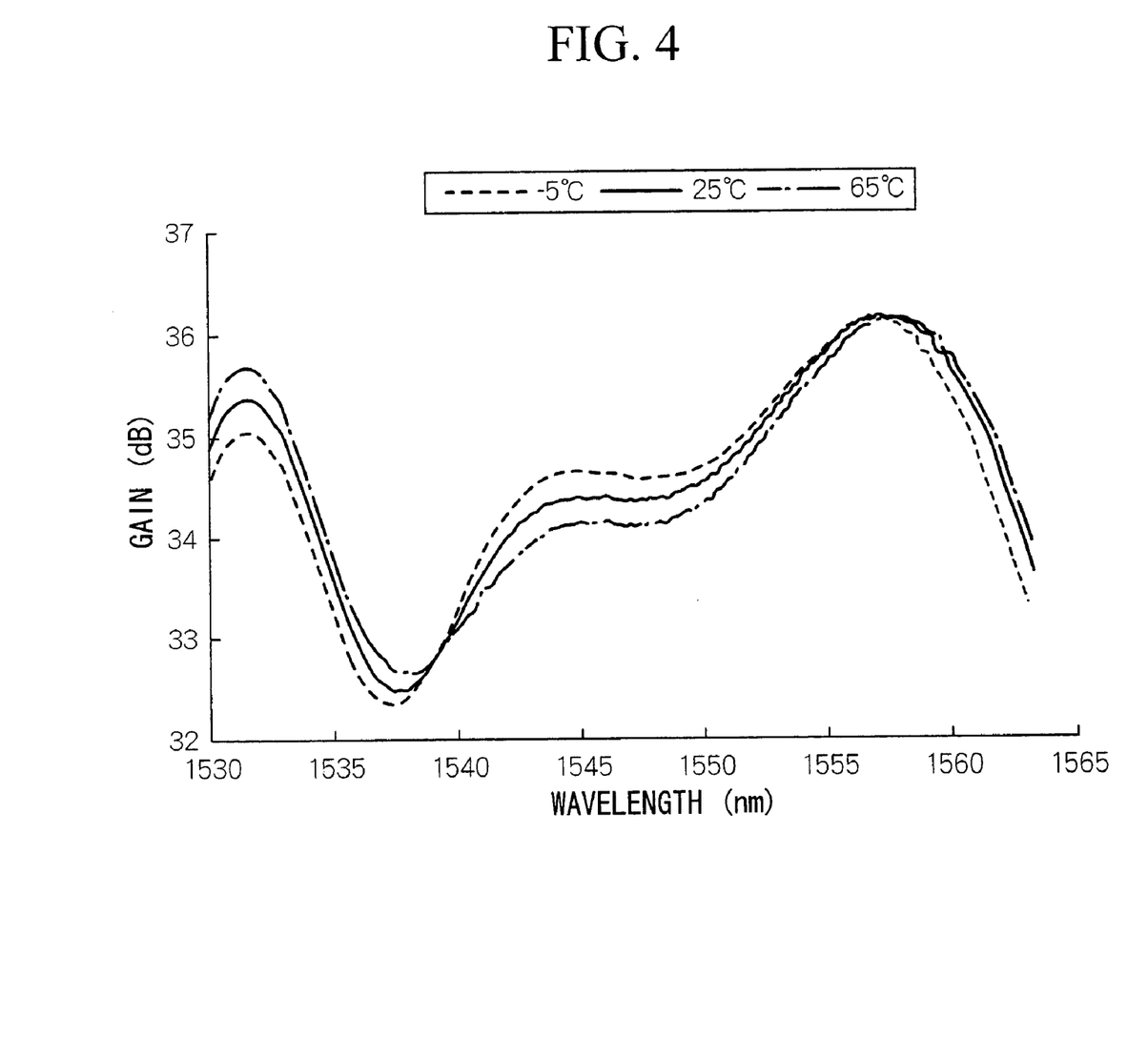
FIG. 4 is a graph showing gain profiles of an EDF at various temperatures.

Next, the signal light is input into the EDF amplifying section 2, and is further amplified by the EDF 11. FIG. 4 is a graph showing gain profiles of an EDF at various temperatures. It is generally known that the gain profile of the EDF changes depending on temperature. For example, in the gain profile, gain in a range from 1530 nm to 1540 nm increases, and gain in another range from 1540 nm to 1560 nm decreases as the temperature increases.

In this embodiment, temperature dependent change in the gain profile of the EDF 11 is compensated for by temperature dependent change in the gain profile of the Raman amplifying section 1, whereby a constant gain profile can be obtained in the entire optical amplifier even when temperature changes.

In order to perform such compensation, at each of the operating wavelengths, temperature dependent change in the gain of the Raman amplifying section 1 is set to be substantially the same as an absolute value, and to have the opposite sign with respect to temperature dependent change in the gain of the EDF 11, i.e., the temperature dependent gain profiles of the Raman amplifying section 1 and the EDF amplifying section are set to be opposite with respect to each other.

The wavelength lock section 8 of the Raman amplifying section is constructed such that the wavelength lock fiber grating 24 transmits light having a shorter wavelength, which is to be input into the amplifying optical fiber 6, as the temperature increases. Because the gain profile of the Raman amplifying section 1 is determined by the wavelength of excitation light source, the gain profile of the Raman amplifying section 1 shifts toward the short wavelength side as the temperature increases.

As shown in FIG. 3, at a temperature of 25° C., the gain profile of the Raman amplifying section 1 exhibits a downwardly convex curve having a minimum at approximately 1540 nm, and an upwardly convex curve having a maximum at approximately 1560 nm.

The gain profile of the Raman amplifying section 1 shifts toward the short wavelength side as the temperature increases, i.e., gain decreases in a range from 1530 nm to 1540 nm, and gain increases in a range from 1540 nm to 1560 nm, and temperature dependent change in the gain of the Raman amplifying section 1 exhibits the opposite sign with respect to temperature dependent change in the gain of the EDF 11.

The material of the support element 21b for the wavelength lock fiber grating 24 is appropriately selected so that the support element 21b has a predetermined thermal expansion coefficient, whereby change in wavelength of light which is transmittable by the wavelength lock fiber grating 24 is appropriately adjusted so that temperature dependent change in the gain of the Raman amplifying section 1 exhibits substantially the same absolute value as that of temperature dependent change in the gain of the EDF 11.

Figure 5:
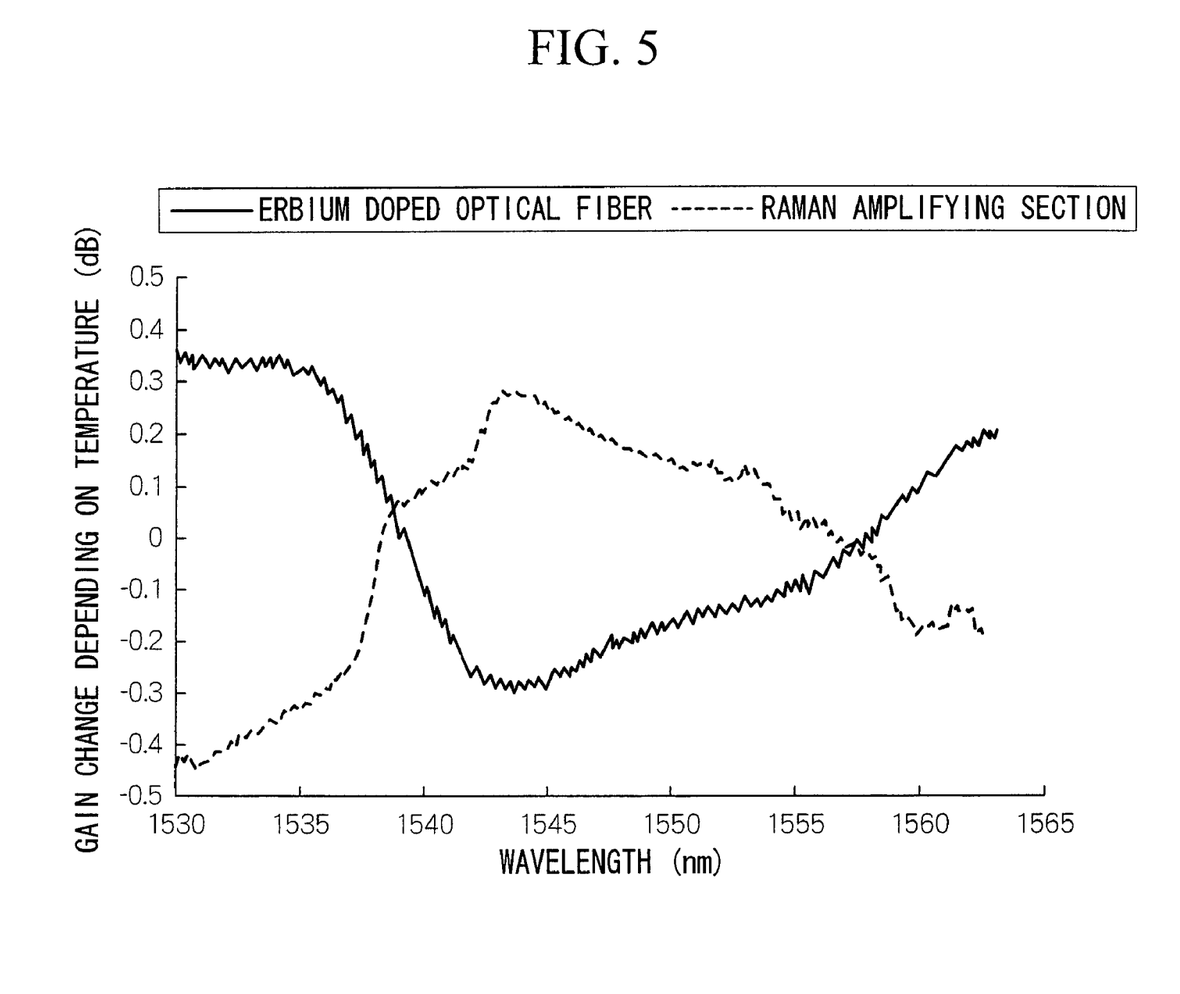
FIG. 5 is a graph showing changes in gain profiles of the Raman amplifying section and the EDF from 25° C. to 65° C.

FIG. 5 is a graph showing changes in the gain profiles of the Raman amplifying section 1 and the EDF 11 from 25° C. to 65° C. In FIG. 5, the change in the gain profiles of the Raman amplifying section 1 was obtained by subtracting the gain profile at 25° C. from the gain profile at 65° C. respectively shown in FIG. 3. Furthermore, the change in the gain profiles of the EDF 11 was obtained by subtracting the gain profile at 25° C. from the gain profile at 65° C., respectively, as shown in FIG. 4.

The wavelength lock section 8 of the Raman amplifying section 1 is constructed as described above, and the wavelength lock section 8 of the Raman amplifying section 1 and the EDF 11 of the EDF amplifying section 2 are accommodated in a body of equipment 14 in order to have the same temperature with respect to each other, whereby it is possible to set the temperature dependent change in the gain of the Raman amplifying section 1 to be substantially the same as an absolute value, and to have the opposite sign with respect to the temperature dependent change in the gain of the EDF 11.

As a result, the temperature dependent change in the gain profile of the EDF 11 is compensated for by the temperature dependent change in the gain profile of the Raman amplifying section 1. Accordingly, signal light is amplified by the Raman amplifying section and EDF 11 in such a manner that a constant gain profile can be obtained even when temperature changes.

The signal light is then input into gain flattening filter 12 of the EDF amplifying section 2. The gain flattening filter 12 is made of, for example, a dielectric multilayer, and has substantially constant transmission loss even when temperature changes.

Figure 6:
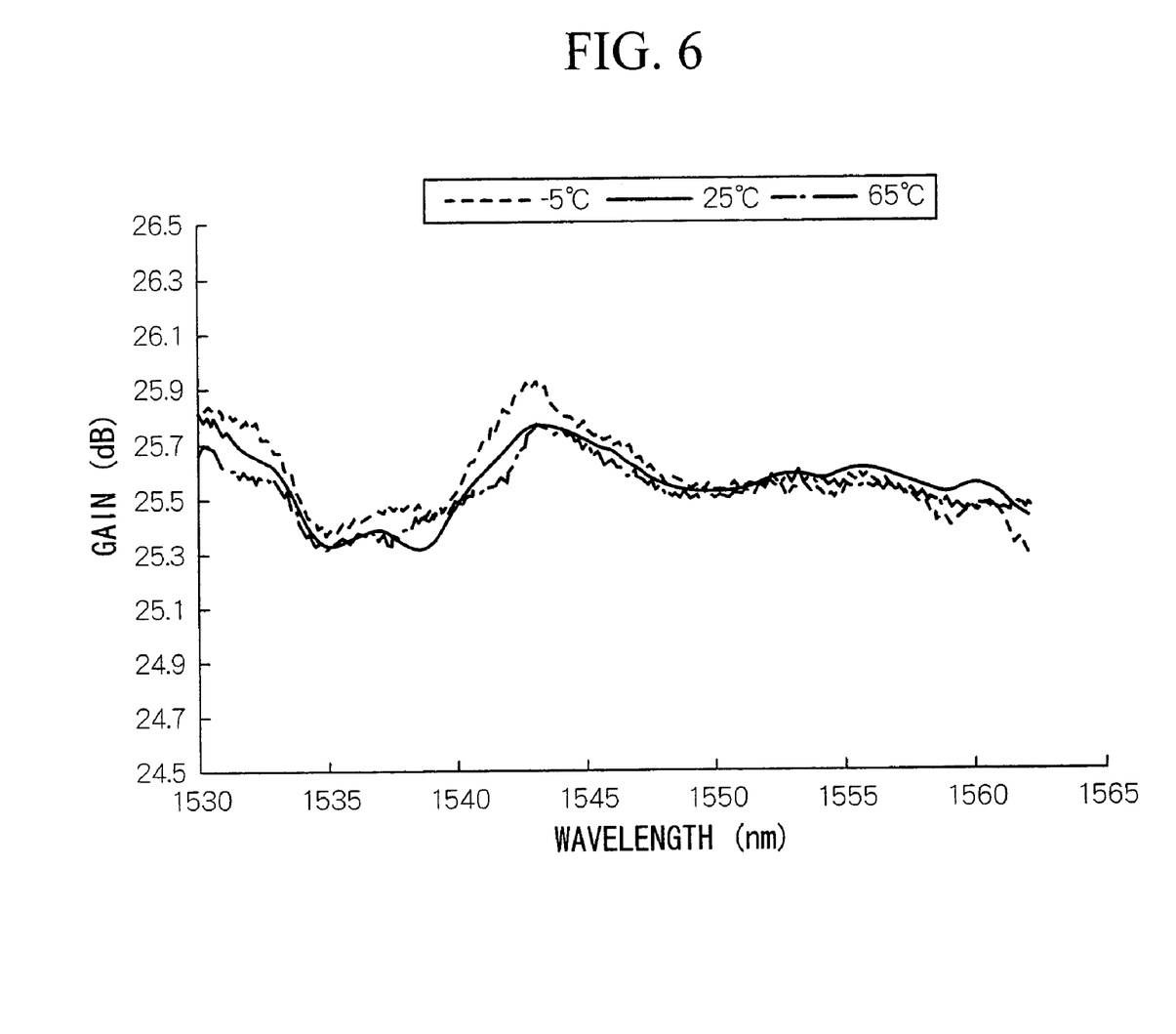
FIG. 6 is a graph showing gain profiles of an optical amplifier according to the present invention at various temperatures.

FIG. 6 shows gain profiles of signal light at various temperatures, which is transmitted through the gain flattening filter 12, and which is output from the output section 13 of the optical amplifier. As shown in FIG. 6, change in the gain profiles due to temperature change is within a range as small as 0.15 dB, which is deemed to be substantially constant.

Furthermore, because the gain profile is substantially constant regardless of temperature, the gain can be accurately flattened by the gain flattening filter 12, i.e., an excellent gain flatness can be obtained, even when temperature changes.

Figure 7:
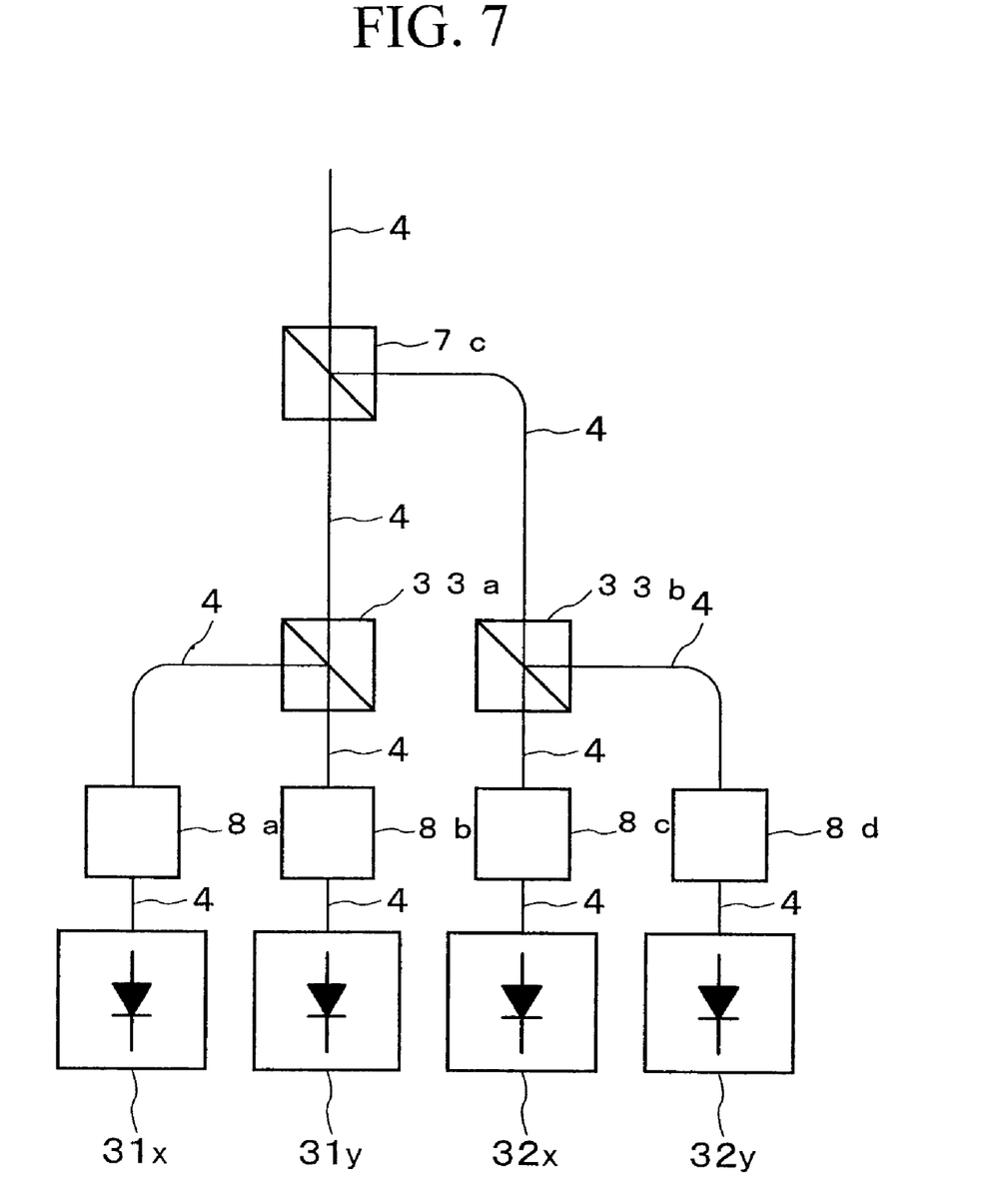
FIG. 7 is a schematic diagram showing an alternative example of an excitation light source of the Raman amplifying section.

In this embodiment, the excitation light source 9 of the Raman amplifying section 1 may comprise a plurality of different light sources. FIG. 7 shows an alternative example of the excitation light source 9. Reference symbols 31$x$, 31$y$, 32$x$, and 32$y$ respectively indicate four kinds of excitation light sources. The excitation light sources 31$x$ and 31$y$ emit excitation lights having the same wavelength, and more specifically, the excitation light source 31$x$ emits excitation light whose polarization plane is defined by the x axis, and the excitation light source 31$y$ emits excitation light whose polarization plane is defined by the y axis.

The excitation light sources 32$x$ and 32$y$ emit excitation lights having the same wavelength, which is different from that of the excitation light sources 31$x$ and 31$y$, and more specifically, the excitation light source 32$x$ emits excitation light whose polarization plane is defined by the x axis, and the excitation light source 32$y$ emits excitation light whose polarization plane is defined by the y axis.

The excitation light sources 31$x$ and 31$y$ and the excitation light sources 32$x$ and 32$y$ are respectively connected to ends of polarization beam combiners 33$a$ and 33$b$ which are, for example, PANDA (Polarization-maintaining AND Absorption-reducing) optical fibers, and both of the other ends of the polarization beam combiners 33$a$ and 33$b$ are connected to a WDM coupler 7$c$. The excitation light is input into the amplifying optical fiber 6 via the WDM coupler, the optical isolator 5$b$, and the WDM coupler 7$a$.

By using excitation lights having different polarization planes as described above, components having polarization dependency may be also used in an optical amplifier.

In addition, when a plurality of excitation light sources emitting lights of different wavelengths are used, the gain profile obtained by the Raman amplifying section 1 is formed by synthesizing gain profiles obtained for respective wavelengths. By using a plurality of excitation light sources emitting lights of different wavelengths as described above, the shape of the gain profile obtained by the Raman amplifying section 1 can be adjusted, whereby the temperature dependent gain profile of the Raman amplifying section 1 can be accurately adjusted to be of the opposite profile with respect to the temperature dependent gain profile of the EDF 11.

Furthermore, in the Raman amplifying section, the excitation light source 9 may be provided at the input side, into which signal light is input, of the amplifying optical fiber 6 as an amplifying medium, and excitation light sources may be provided at both of the input and output sides. Similarly, in the EDF amplifying section 2, the excitation light source 10 may be provided at the output side, from which signal light is output, of the EDF 11 as an amplifying medium, and excitation light sources may be provided at both of the input and output sides. Moreover, the Raman amplifying section 1 may be disposed downstream of the EDF amplifying section 2.

Furthermore, in the Raman amplifying section 1, the amplifying optical fiber 6 as an amplifying medium may function as a signal transmission optical fiber as well. In this case, the optical transmission path forms the optical transmission path of the present invention as explained below.

The optical transmission path of the present invention is formed by providing the wavelength lock section 8 of the Raman amplifying section 1, the excitation light source 9, and so on, in a base optical transmission path having signal transmission optical fibers and the EDF amplifying section 2, wherein the EDF 11 of the EDF amplifying section 2 and the wavelength lock section 8 are disposed in order to have the same temperature. Because an existing optical transmission path can be used as the base optical transmission path, cost reduction may be achieved.

Advantageous Effects Obtainable by the Invention

As explained above, according to the present invention, a substantially constant gain flatness can be obtained in an optical amplifier even when temperature changes. Moreover, because the gain profile is substantially maintained to be unchanging regardless of temperature, the gain profile can be accurately flattened by a gain flattening filter; therefore, an excellent gain flatness can be achieved.

In addition, because an external electrical power source is not required to make the gain flatness be substantially constant, electrical consumption of the optical amplifier may be restrained. Moreover, because the temperature dependent gain profile of the EDF is compensated for by the gain of the Raman amplifying section, a gain profile which is substantially constant regardless of temperature, and which is relatively great can be obtained; therefore, signal light can be effectively amplified.

Moreover, according to the present invention, the structure of an optical amplifier may be simplified, whereby the size of a device may be reduced. Furthermore, because an existing optical transmission path can be used as the base optical transmission path when the optical transmission of the present invention is constructed, cost reduction may be achieved.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An optical amplifier, comprising:
an erbium doped optical fiber (EDF) amplifying section; and
a Raman amplifying section,
wherein the Raman amplifying section has a temperature dependent gain profile which enables compensating for temperature dependent changes in a gain profile of the EDF amplifying section.

2. An optical amplifier according to claim 1,
wherein the Raman amplifying section comprises a wavelength lock grating whose transmission wavelengths shift toward the short wavelength side as the temperature increases.

3. An optical amplifier according to claim 2,
wherein the wavelength lock grating is disposed to have the same temperature as that of an EDF included in the EDF amplifying section.

4. An optical amplifier according to claim 2,
wherein the wavelength lock grating is an optical fiber having a grating in which the refractive index of a core thereof varies at a predetermined period.

5. An optical amplifier according to claim 1, wherein the Raman amplifying section is disposed upstream with respect to the EDF amplifying section.

6. An optical amplifier according to claim 1, wherein the Raman amplifying section is disposed downstream with respect to the EDF amplifying section.

7. An optical amplifier according to claim 1, wherein the EDF amplifying section and a wavelength lock grating are accommodated in single body of equipment.

8. A method for compensating for temperature dependent gain flatness of an optical amplifier comprising:
providing an EDF amplifying section and a Raman amplifying section in the optical amplifier; and
setting the temperature dependent gain profile of the EDF amplifying section and the temperature dependent gain profile of the Raman amplifying section to compensate for each other when temperature changes.

9. A method according to claim 8, wherein the Raman amplifying section comprises a wavelength lock grating whose transmission wavelengths shift toward the short wavelength side as the temperature increases.

10. A method according to claim 9, wherein the method further comprises making the temperature of the wavelength lock grating the same as that of an EDF included in the EDF amplifying section.

11. An optical transmission path comprising:
a base transmission path including a signal transmission optical fiber and an EDF amplifying section for amplifying signal light passing through the signal transmission optical fiber; and
a Raman amplifying section, which includes an excitation light source for performing a Raman type amplification using the signal transmission optical fiber as an amplifying medium, and a wavelength lock grating that transmits excitation light having a predetermined wavelength to input the excitation light into the signal transmission optical fiber, wherein
transmission wavelengths of the wavelength lock grating shift toward the short wavelength side as the temperature increases.

12. An optical transmission path according to claim 11, wherein the excitation light source comprises a plurality of different light sources.

13. An optical transmission path according to claim 12, wherein the plurality of different light sources have at least two different wavelengths.

14. An optical transmission path according to claim 12, wherein the plurality of different light sources have at least two different polarization planes.

* * * * *